US005531138A

United States Patent [19]

Vetter

[11] Patent Number: 5,531,138

[45] Date of Patent: Jul. 2, 1996

[54] WINDOW OPERATOR HOUSING

[75] Inventor: Gregory J. Vetter, Owatonna, Minn.

[73] Assignee: Truth Hardware Corporation, Owatonna, Minn.

[21] Appl. No.: 272,126

[22] Filed: Jul. 8, 1994

[51] Int. Cl.$^6$ .................................................. F16H 57/02

[52] U.S. Cl. .................... 74/606 R; 74/89.14; 74/89.18; 74/545; 49/324; 49/337

[58] Field of Search .............................. 74/606 R, 89.18, 74/89.19, 545–547, 89.14; 49/324–338; 16/110 R, 110.5

[56] References Cited

U.S. PATENT DOCUMENTS

| | | | |
|---|---|---|---|
| 1,686,171 | 10/1928 | Parsons | 74/89.19 |
| 1,757,474 | 5/1930 | Potter | 49/337 |
| 2,138,539 | 11/1938 | Flynn | 49/337 |
| 2,304,960 | 12/1942 | Schane | 49/337 |
| 3,638,358 | 2/1972 | Mason | 49/325 |
| 4,011,764 | 3/1977 | Buck et al. | 74/89.18 |
| 4,241,541 | 12/1980 | Van Klompenburg | 49/249 |
| 4,617,758 | 10/1986 | Vetter | 49/324 |
| 4,823,508 | 4/1989 | Allen | 49/252 |
| 4,840,075 | 6/1989 | Tucker | 74/89.14 |
| 5,168,770 | 12/1992 | Ellis | 74/545 |

FOREIGN PATENT DOCUMENTS

| | | | |
|---|---|---|---|
| 4080972 | 10/1973 | Australia | 49/324 |
| 595250 | 3/1960 | Canada | 49/324 |
| 1268013 | 5/1968 | Germany | 49/324 |
| 2204994 | 8/1973 | Germany | 49/324 |
| 1527723 | 10/1978 | United Kingdom | 49/324 |
| 2247279 | 2/1992 | United Kingdom | 49/333 |

*Primary Examiner*—Vinh T. Luong
*Attorney, Agent, or Firm*—Wood, Phillips, VanSanten, Clark & Mortimer

[57] ABSTRACT

A housing assembly for a window operating assembly having a drive shaft and drive shaft boss having recesses on opposite sides thereof. The housing assembly includes a cover having a top side with an opening therethrough and sides depending from the top side to define an interior and an exterior. The cover is open on the interior for receiving a portion of the window operating assembly including a drive shaft boss portion with a portion of the drive shaft extending through the top side opening to the exterior. The depending sides having outer edges mateable with a window operating assembly to maintain alignment of the cover with a substantial portion of the operating assembly housed by the cover. A discrete connecting member is secured to the cover interior and includes an oblong opening with a narrow portion having a radial dimension less than that of the drive shaft boss. The oblong opening is axially aligned with the cover annular opening and, when secured to the operating assembly, has its narrow portion substantially radially aligned with and received in the drive shaft boss recess.

12 Claims, 2 Drawing Sheets

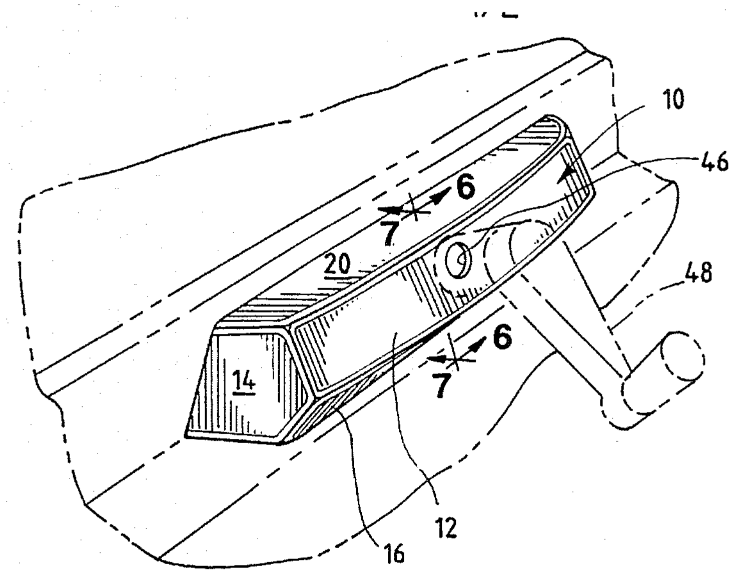
Fig. 1
Fig. 2
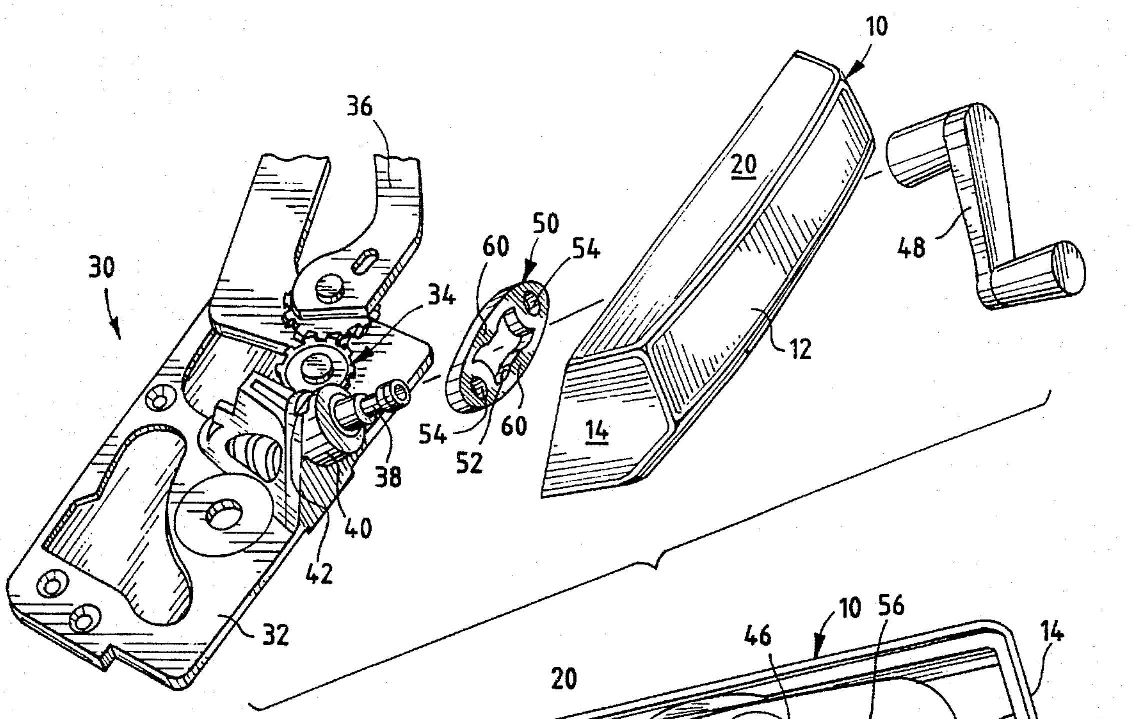
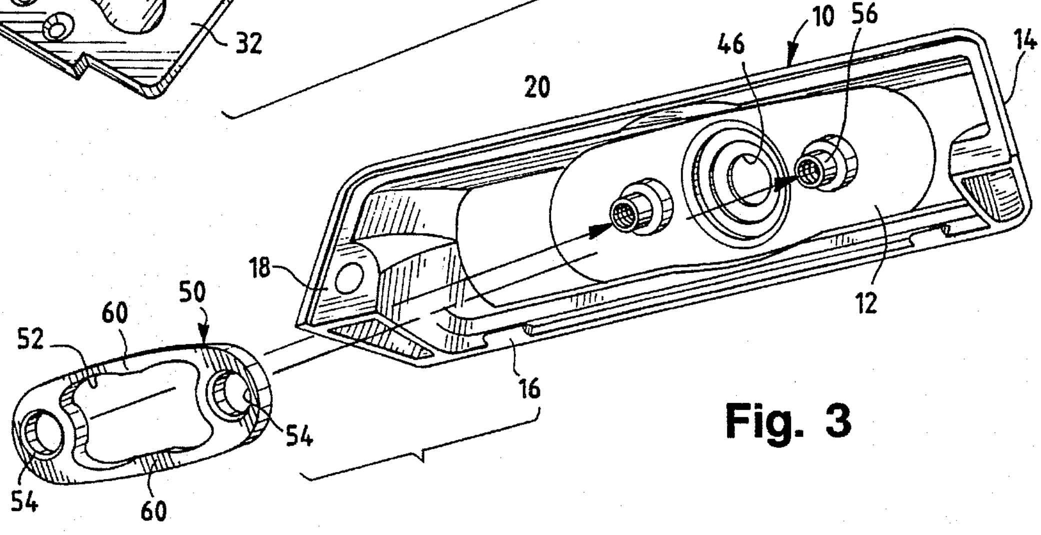
Fig. 3

WINDOW OPERATOR HOUSING

BACKGROUND OF THE INVENTION

1. Technical Field

The present invention relates to a housing assembly and more particularly to an assembly for housing a window operating assembly of a type used in opening and closing a window.

2. Background Art

Assemblies for housing window operating assemblies of the type used in opening and closing a window are old in the art. Window operating assemblies have numerous moving components and typically have a drive shaft and moving gears and the like.

Housings are attached to window operating assemblies for a number of reasons. Some of these reasons include protecting the window operating components from damage, protecting the user from injury from the window gears, operating components, and other moving parts, and for aesthetic purposes.

Typically, such housings have been formed of plastic for a variety of reasons, including their ability to be readily mounted to the operating assemblies. However, such plastic covers can be relatively weak and susceptible to breaking and therefore may have a short working life. Further, plastic covers may not provide the aesthetics desired for some installations.

The present invention is specifically directed toward overcoming one or more of the problems discussed above.

SUMMARY OF THE INVENTION

In one aspect of the present, a housing assembly is provided for a window operating assembly having a drive shaft and drive shaft boss having recesses on opposite sides thereof. The housing assembly includes a cover having a top side with an opening therethrough and sides depending from the top side to define an interior and an exterior. The cover is open on the interior for receiving a portion of the window operating assembly including a drive shaft boss portion with a portion of the drive shaft extending through the top side opening to the exterior. The depending sides having outer edges mateable with a window operating assembly to maintain alignment of the cover with a substantial portion of the operating assembly housed by the cover. A discrete connecting member is secured to the cover interior and includes an oblong opening with a narrow portion having a radial dimension less than that of the drive shaft boss. The oblong opening is axially aligned with the cover annular opening and, when secured to the operating assembly, has its narrow portion substantially radially aligned with and received in the drive shaft boss recess.

In another aspect of the present invention, the housing assembly is provided with a window operating assembly.

It is an object of the present invention to provide a new and improved housing for a window operating assembly.

It is another object of the present invention to provide a housing for a window operating assembly that is durable and has a long useful life.

It is yet another object of the present invention to provide a housing that is easily and inexpensively installed, both in new installations as well as retrofitting with existing installations.

It is still another object of the present invention to provide a housing that is aesthetically pleasing.

Still other aspects, objects, and advantages of the present invention can be obtained from a study of the specification, the drawings, and the appended claims.

BRIEF DESCRIPTION OF THE DRAWINGS

FIG. 1 a perspective view of the housing with an exemplary window handle and installed window environment shown in phantom;

FIG. 2 is an exploded view of a housing cover, handle, and window operating assembly;

FIG. 3 is an exploded view of the housing and connecting member;

DESCRIPTION OF THE PREFERRED EMBODIMENT

FIG. 1 illustrates a cover 10 as installed in a window environment (shown in phantom). The cover 10 shown in the figures is an example of one shape or appearance which can be used with the present invention, but it should be understood that, within certain limitations which will become apparent hereafter, covers of any number of shapes and appearances could be used with the present invention.

The cover 10 includes a top side 12 and depending sides 14, 16, 18, 20 which together form an open-sided enclosure or interior 22 on one side, with the exterior being the area on the opposite side of the sides 12–20.

Figure 6:
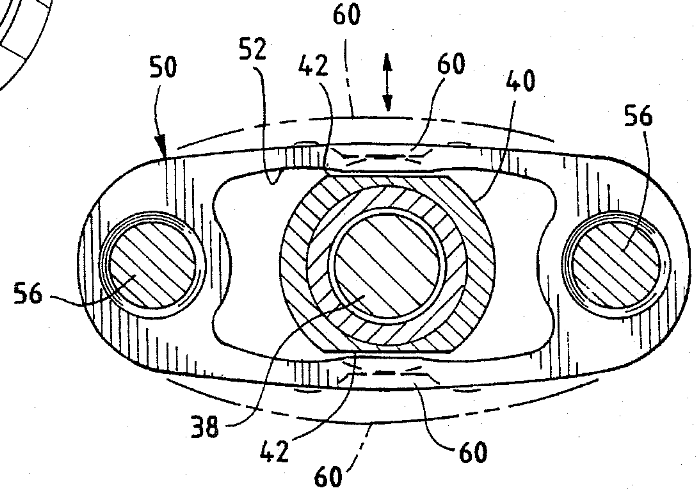
FIG. 6 is a partial cross-sectional view (taken along line 6—6 of FIG. 1) and partial phantom view illustrating the connection of the connecting member the drive shaft boss.

The cover 10 is mounted to a window operator assembly, an exemplary such assembly 30 being shown in FIG. 2. The operator assembly 30 of FIG. 2 is a dual arm operator more fully shown in U.S. Pat. No. 4,241,541, which is hereby fully incorporated by reference. However, it should be understood that the cover 10 of the present invention could be used with a wide variety of different operator structures which pivot arms at the window frame to move the window sash, such as dyad operators, awning operators, and single arm operators. Typically, all such operators include a base 32 which is securable to the window frame and include a suitable gear drive 34 for pivoting the operator arms 36. A worm drive shaft 38 is angled upwardly and supported for pivoting by a drive shaft boss 40 integrally formed with the base 32. The boss 40 also includes recesses 42 on opposite sides thereof (see FIGS. 2, 6 and 7).

The cover 10 of the present invention, as with conventional covers, preferably is disposed with its top side 12 at an angle to vertical which is substantially perpendicular to the pivot axis of the drive shaft 38 and including an opening 46 through which the outer end of the drive shaft 38 extends (to the exterior of the cover). A suitable handle 48 (see FIGS. 1–2) is suitably secured to the outer end of the drive shaft 38 to permit manual pivoting of the drive shaft 38 and associated operation of the operator assembly 30.

The cover 10 encloses the side of the operator assembly 30 which would otherwise be exposed to the room, while being open toward the outside of the window to permit the required range of movement of the operator arms 36 for opening and closing of the window sash. As best seen in FIG. 1, when the window sash is closed, the cover 10 cooperates with the window frame and the window sash to completely hide the operator assembly 30 from view.

Figure 4:
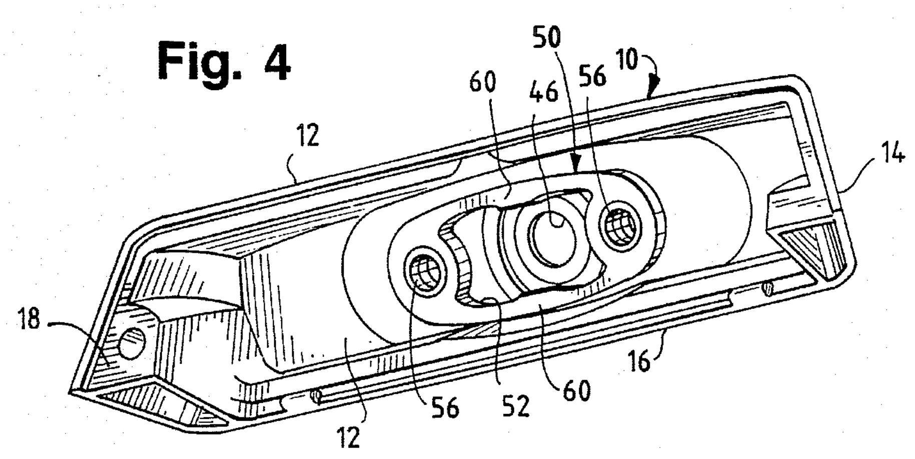
FIG. 4 is a perspective view of the showing the interior of the cover of the present invention.
Figure 5:
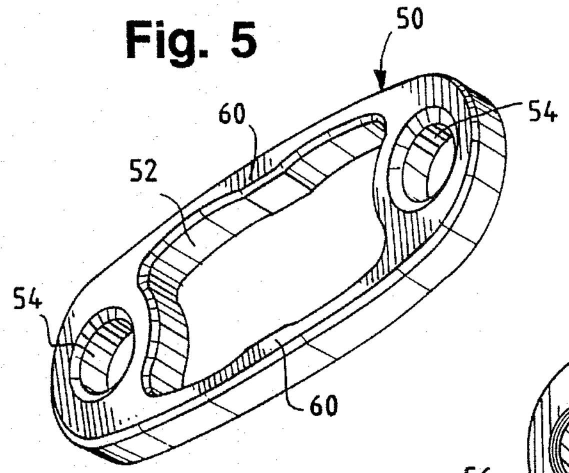
FIG. 5 is a perspective view of the connecting member of the present invention.

Referring now more specifically to the improved cover structure, and to FIGS. 2–4, an oblong or elliptical connecting member 50 is provided which includes an oblong opening 52 therethrough. Holes 54 are provided at the wide ends of the connecting member 50 in which may be received suitable, connectors such as rivets 56 for securing the connecting member 50 to the cover 10. Thus, as seen in FIG. 4, the connecting member 50 may be made of a hard but somewhat flexible material, such as polycarbonate, acetal, or nylon (as is preferred for mounting as discussed in detail hereafter), while the cover 10 may be made of a completely different material such as metal which will not only provide greater durability than many conventional plastic covers but will also permit the cover to be given a different aesthetic appearance.

The connecting member oblong opening 52 has a narrow portion having a radial dimension which is less than the diameter of the operator drive shaft boss 40. In the preferred embodiment shown, the narrow portion is defined by thickened sections 60 which cause the opening 52 to be convex at that portion.

Figure 7:
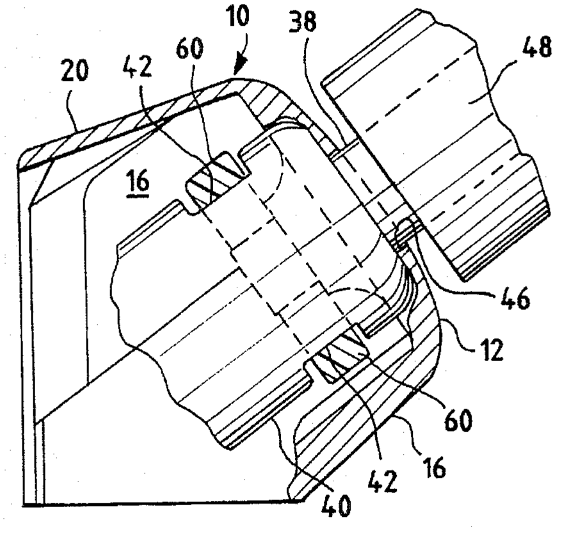
FIG. 7 is a cross-sectional (taken along line 7—7 of FIG. 1 ) partially broken away side view illustrating the connection of the cover to the operating assembly boss.

Installation of the cover 10 of the present invention is thus accomplished by aligning the cover opening 46 with the end of the drive shaft 38 and then pressing the cover 10 down along the shaft 38. When the connecting member 50 engages the end of the operator assembly boss 40, it will initially be flexed outwardly at the narrow portion (to the position shown in phantom in FIG. 6) to clear the end of the boss 40. When the narrow portion of the connecting member 50 reaches the boss recesses 42, that portion will snap back together so that the thickened sections 60 of the member 50 are in the recesses 42 as shown in FIG. 7 to thereby hold the cover 10 on the boss 40. Further, preferably several of the depending sides 14–20 will have edges which abut against the operator assembly base 32 in this position so as to further secure the cover 10 against any movement when installed. The handle 48 may then be suitably secured to the extending outer end of the drive shaft 38 to thereby also prevent removal of the cover 10 from this installed position.

It should thus now be apparent that the present invention permits the use of a wide variety of covers or housings for many new and existing window operators, including covers of virtually any material based on the desired strength and durability, as well as the desired aesthetics. Such inexpensively manufactured covers are also easily and inexpensively installed at new installations as well as retrofitting with existing installations.

I claim:

1. A housing assembly for housing a portion of a window operating assembly which includes a drive shaft and a drive shaft boss having recesses on opposite sides thereof, said housing assembly comprising:

a cover having a top side with an annular opening therethrough and sides depending from the top side to define an interior and an exterior, said cover being open on the interior for receiving a portion of a window operating assembly including a drive shaft boss with a portion of a window operating assembly drive shaft extending through the top side opening to the exterior, said depending sides having outer edges mateable with a window operating assembly to maintain alignment of the cover with a substantial portion of a window operating assembly housed by the cover;

a discrete connecting member having an oblong opening therethrough, said oblong opening having a narrow portion with a radial dimension less than that of a drive shaft boss for securely fitting with recesses on opposite sides of a drive shaft boss; and means for securing said connecting member to the interior of the cover with the oblong opening and annular opening substantially axially aligned and the narrow portion substantially radially aligned with recesses on opposite sides of a drive shaft boss.

2. The housing assembly of claim 1, wherein the cover is metal and the connecting member is a hard flexible plastic.

3. The housing assembly of claim 2, wherein the connecting member is polycarbonate.

4. The housing assembly of claim 2, wherein the connecting member is acetal.

5. The housing assembly of claim 2, wherein the connecting member is nylon.

6. The housing assembly of claim 1, wherein the connecting member is radially thickened at the narrow portion of the oblong opening.

7. The housing assembly of claim 1, wherein the surface defining the oblong opening is convex at the narrow portion.

8. The housing assembly of claim 1, wherein the securing means are rivets received in holes on opposite sides of the connecting member.

9. The housing assembly of claim 1, further comprising a window operating assembly including a drive shaft and a drive shaft boss having recesses on opposite sides thereof, said drive shaft extending to the cover exterior through the top side opening of the cover, and said drive shaft boss recesses receiving portions of said connecting member disposed on opposite sides of said narrow portion of said oblong opening when said connecting member is secured to the interior of the cover.

10. A window operator for controlling the position of a window comprising:

a window operating assembly including a drive shaft rotatably received in a drive shaft boss having recesses on opposite sides thereof;

a cover having a top side with an annular opening therethrough and sides depending from the top side to define an interior and an exterior, said cover being open on the interior for receiving at least a portion of the drive shaft boss whereby a portion of the drive shaft extends through the top side opening to the exterior, said cover depending sides having outer edges mateable with the window operating assembly to maintain alignment of the cover with a substantial portion of the window operating assembly housed by the cover;

a discrete connecting member having an oblong opening therethrough, said oblong opening having a narrow portion with a radial dimension less than that of the drive shaft boss and aligned with the drive shaft boss recesses whereby the narrow portion is received in the drive shaft boss recesses; and means for securing said connecting member to the interior of the cover.

11. The assembly of claim 10, wherein the connecting means oblong opening includes a radially thickened narrow portion and a convex portion wherein the connecting means securely fits with the drive shaft boss recesses.

12. The assembly of claim 10, wherein the securing means are rivets received in holes on opposite sides of the connecting means, with said narrow portion being between said holes.

* * * * *